(12) United States Patent
Wilkins

(10) Patent No.: US 7,303,222 B2
(45) Date of Patent: Dec. 4, 2007

(54) TIRE CARRIER APPARATUS

(76) Inventor: Paul T. Wilkins, 1902 Derby Dr., Santa Ana, CA (US) 92705

( * ) Notice: Subject to any disclaimer, the term of this patent is extended or adjusted under 35 U.S.C. 154(b) by 0 days.

(21) Appl. No.: 11/440,521

(22) Filed: May 25, 2006

(65) Prior Publication Data
US 2006/0290156 A1 Dec. 28, 2006

Related U.S. Application Data

(63) Continuation of application No. 11/167,711, filed on Jun. 27, 2005.

(51) Int. Cl.
*B60R 9/00* (2006.01)
(52) U.S. Cl. .................. 296/37.6; 296/37.2; 224/42.21
(58) Field of Classification Search ............. 296/146.8, 296/50, 51, 37.6, 146.11, 146.12, 37.2; 224/42.12, 224/42.21
See application file for complete search history.

(56) References Cited

U.S. PATENT DOCUMENTS

| | | | |
|---|---|---|---|
| 3,027,188 A | 3/1962 | Eichstadt | |
| 3,173,708 A | 3/1965 | Machielse | |
| 4,771,926 A * | 9/1988 | Anderson et al. | 224/42.13 |
| 5,358,157 A * | 10/1994 | Abretske | 224/509 |
| 6,039,226 A | 3/2000 | Brown | |
| 6,059,155 A | 5/2000 | Young | |
| 6,142,548 A | 11/2000 | Kuhn | |
| 6,340,190 B1 | 1/2002 | Roseburgh | |
| 6,540,123 B1 | 4/2003 | Kmita | |
| 6,764,130 B1 * | 7/2004 | Hull | 296/186.4 |

* cited by examiner

*Primary Examiner*—Joseph D Pape
(74) *Attorney, Agent, or Firm*—Stetina Brunda Garred & Brucker

(57) ABSTRACT

A tire carrier apparatus is provided for mounting a tire upon a storage bed of a vehicle. The bed includes first and second side walls and a rear end. The apparatus comprises at least a vertical post, a latch member, and a gate. The vertical post may be connectable to the first side wall adjacent the rear end. The latch member may be connectable to the second side wall adjacent the rear end. The gate may define first and second ends and a receptacle interposed therebetween, with the first end being pivotally connectable to the vertical post and the second end being removably connectable to the latch member. The receptacle may be sized and configured to accommodate the tire with the tire being mountable thereon.

13 Claims, 4 Drawing Sheets

TIRE CARRIER APPARATUS

CROSS-REFERENCE TO RELATED APPLICATIONS

The present application is a continuation of U.S. patent application Ser. No. 11/167,711 entitled TIRE CARRIER APPARATUS filed Jun. 27, 2005, the entirety of the disclosures of which are expressly incorporated herein by reference.

STATEMENT RE: FEDERALLY SPONSORED RESEARCH/DEVELOPMENT

Not Applicable

BACKGROUND

The present invention relates generally to devices adapted to be used in connection with a bed of a vehicle to enhance the carrying capacity of the vehicle, and more particularly, to a tire carrier apparatus which may be utilized to carry oversized tires and is uniquely adapted to be positioned in either an inward or an outward position and may open horizontally to provide access to the bed of the vehicle.

More consumers are purchasing vehicles that provide storage space for transporting various objects. In particular, automobile manufacturers have seen increases in the sales of high cargo-capacity vehicles such as trucks. It has been noted that economic prosperities from the early 21st century have resulted in increased demand for trucks due to their cargo carrying capacity. In response to the demand for increased cargo capacity, various apparatuses have been developed which are intended to increase vehicle cargo capacity.

In addition to the increased sales of medium and heavy duty trucks over recent years, there has also been an increase in the modifications made to trucks that transform the trucks into off-road vehicles. Such modifications may include raised fenders, improved suspension systems oversized wheels, and other various improvements to enhance the durability, terrain capability, and maneuverability of a truck.

Due to the modifications made by the off-roading enthusiast, the truck may have, as mentioned above, oversized tires, a modified suspension system, and perhaps include various modifications to the frame or undercarriage. As often results, the modified truck may no longer have the capacity to store objects such as spare tires or tools. The original unmodified truck may normally include a storage well wherein a spare tire may be mounted. In this regard, if a truck has been modified to utilize oversized tires, it is unlikely that the oversized tires may fit into the traditional storage wells of the original truck.

Several inventions teach apparatuses that are adapted to be attached to an existing tailgate of a vehicle and that may be used to increase bed carrying capacity. For example, one such invention discloses a pickup truck bed extender apparatus that is mounted to the truck bed side walls. The apparatus includes a center wall and two opposing end walls which may be collapsed toward the center wall. The center wall is rotatably connected to the tailgate and upon collapse of the side walls into the center wall, the center wall may be rotated towards the tailgate in order to facilitate storage of the apparatus within the truck bed. Various other inventions teach slight modifications to the general idea of extending the storage bed utilizing a frame with opposing side walls and a center wall. In one such modification, another invention teaches the use of covers or "skins" to "dress up" the external appearance of the extension apparatus.

Although these bed extension apparatuses may have improved cargo capacity for some, the off-road enthusiast has not benefited in like manner. Although versatile, these apparatuses do not provide any useful benefits to the consumer with specific regard to off-roading capability. For example, as mentioned above, such apparatuses do not allow the user to store objects such as oversized spare tires or tools.

For the reasons mentioned above, there exists a need in the art for an apparatus that is specifically adapted to accommodate the demands of an off-road vehicle. In this regard, there exists a need for a tire carrier apparatus specifically adapted to transport oversized tires thereon. There also exists a need for a tire carrier apparatus that provides easy access to the truck bed. Additionally, there exists a need in the art for a durable and sturdy tire carrier apparatus that may withstand the rigors of off-roading.

BRIEF SUMMARY

In accordance with an embodiment of the present invention, a utility carrier apparatus is provided for mounting a module upon a storage bed of a vehicle. The storage bed includes first and second side walls and a rear end. The module may be any equipment such as a tire, tools, a toolbox, a lift jack, a light(s), a gas can, etc. The apparatus comprises a vertical post, a latch member, and a gate. The vertical post may be connectable to the first side wall adjacent the rear end. The latch member may be connectable to the second side wall adjacent the rear end. The gate may define first and second ends and a receptacle interposed therebetween. The first end may be pivotally connectable to the vertical post, and the second end being removably connectable to the latch member. The receptacle may be sized and configured to accommodate the module with the module being mountable thereon.

According to an aspect of the present invention, the storage bed may define a horizontal plane and the receptacle may define a receptacle plane. In this regard, the receptacle plane may be oriented at an angle with respect to the horizontal plane. Although the angle may be any angle from zero to ninety degrees, it is contemplated that a preferred embodiment includes orienting the receptacle plane at approximately a 35 degree angle with respect to the horizontal plane.

The receptacle may be substantially disposable within the bed of the vehicle in what may be termed an "inboard" position. Additionally, the receptacle may be substantially disposable outside of the bed of the vehicle in what may be termed an "outboard" position.

The apparatus may further include an optional transverse torque arm. The transverse torque arm may extend between the vertical post and the latch member and may be mechanically engageable to each of the vertical post and the latch member.

It is contemplated that the apparatus, including the vertical posts and the gate, may be of tubular construction. Further, the apparatus may also be of solid construction. The apparatus may be manufactured from any material such as a polymer, metal, or, composite.

In accordance with another aspect of the present invention, the first end of the gate may include upper and lower mounts and the first vertical post may include a pair of hinge elements sized and configured to receive the respective ones of the upper and lower mounts. Additionally, the first vertical post may define a first vertical axis, and the apparatus may further include a pair of pivot pins. In this regard, the pivot pins may be selectively disposable through the hinge elements and the respective upper and lower mounts with the first end being pivotal about the first vertical axis.

The latch member may also be a second vertical post. The second end of the gate may include upper and lower mounts, and the second vertical post may include a pair of hinge elements sized and configured to receive the respective ones of the upper and lower mounts. The apparatus may further include a pair of pivot pins being selectively disposable through the hinge elements and the respective upper and lower mounts. The pivot pins may be operative to impede the horizontal pivoting of the gate about the first vertical axis.

In accordance with another embodiment of the present invention, a tire carrier apparatus is provided for mounting a tire upon a storage bed of a vehicle. The storage bed may include first and second side walls and a rear end. The apparatus may comprise first and second vertical posts and a gate. The first and second vertical posts may each be connectable to the respective ones of the first and second side walls adjacent the rear end. The first and second vertical posts may also each define respective first and second vertical axes. The gate may define first and second ends and a receptacle interposed therebetween. The first and second ends may be pivotally connectable to the respective ones of the first and second vertical posts. In this regard, the first end may be pivotable about the first vertical axis upon the second end being unconnected from the second vertical post. Additionally, the second end may be pivotable about the second vertical axis upon the first end being unconnected from the first vertical post. Further, the receptacle may be sized and configured to accommodate the tire with the tire being mountable thereon.

According to an aspect of the present invention, the storage bed may define a horizontal plane and the receptacle may define a receptacle plane. In this regard, the receptacle plane may be oriented at an angle with respect to the horizontal plane. Although the angle may be any angle from zero to ninety degrees, it is contemplated that a preferred embodiment includes orienting the receptacle plane at a 35 degree angle with respect to the horizontal plane.

The receptacle may be substantially disposable within the bed of the vehicle in what may be termed an inboard position. Additionally, the receptacle may be substantially disposable outside of the bed of the vehicle in what may be termed an outboard position.

The apparatus may further include a transverse torque arm. The transverse torque arm may extend between the vertical post and the latch member and may be mechanically engageable to each of the vertical post and the latch member.

It is contemplated that the vertical posts may be tubular. Further, it is contemplated that the gate may be of tubular construction.

In accordance with yet another embodiment of the present invention, a tire carrier apparatus is provided for mounting a tire upon a storage bed of a vehicle. The storage bed may include first and second side walls and a rear end and defining a horizontal plane. The apparatus may comprise first and second tubular vertical posts, a gate, and a transverse torque arm. The first and second tubular vertical posts may each be connectable to the respective ones of the first and second side walls adjacent the rear end. The first vertical post may define a first vertical axis. The gate may define first and second ends and a receptacle interposed therebetween. The gate may be of tubular construction. The first end may be pivotally connectable to the first vertical post and pivotal about the first vertical axis. The second end may be removably connectable to the second vertical post. The receptacle may define a receptacle plane being oriented at an angle with respect to the horizontal plane. The receptacle may also be sized and configured to accommodate the tire with the tire being mountable thereon. The transverse torque arm may extend between the vertical posts and may be mechanically engageable thereto.

The receptacle may be substantially disposable within the bed of the vehicle in what may be termed an inboard position. Additionally, the receptacle may be substantially disposable outside of the bed of the vehicle in what may be termed an outboard position.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
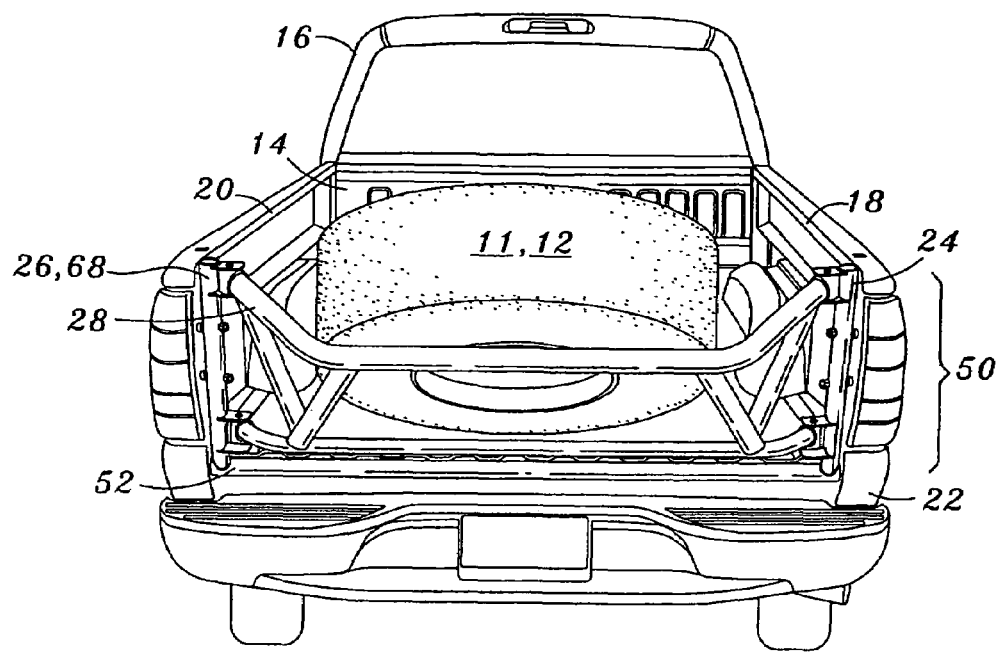
FIG. 1 is a perspective rear view of a utility carrier apparatus installed upon a vehicle in accordance with an aspect of the present invention.

Referring now to the drawings wherein the showings are for purposes of illustrating the preferred embodiments of the present invention only and not for purposes of limiting the same, FIG. 1 is a perspective rear view of a utility carrier apparatus 10 in accordance with an aspect of the present invention.

In accordance with an embodiment of the present invention, a utility carrier apparatus 10 is provided for mounting a module 11 such as a tire 12, a gas can, a lift jack, lights, or other equipment, upon a storage bed 14 of a vehicle 16. The apparatus 10 may be utilized on a variety of vehicles 16 that have storage beds 14; however, the apparatus 10 may likely be used most commonly on pick-up trucks or jeeps. One of the significant advantages of a preferred embodiment of the invention provides that the apparatus 10 is configured to be mounted onto the vehicle 16 utilizing the standard tailgate mounting points. Thus, a user may simply remove the tailgate of the vehicle 16 and replace it with the apparatus 16 without any modification to the storage bed 14 of the vehicle 16. In particular, the apparatus 10 may be utilized on off-road vehicles 16 in order to facilitate the storage of oversized tires 12, although other modules 11 may be stored thereon, as described above. With regard to the tire 12, standard tire storage areas on typical vehicles 16 do not accommodate larger, oversized tires 12 that are commonly used for off-roading and certain vehicle modifications.

Therefore, an implementation of the present invention may allow owners of off-road vehicles 16 and modified vehicles 16 to safely and conveniently store oversized tires 12.

Figure 2:
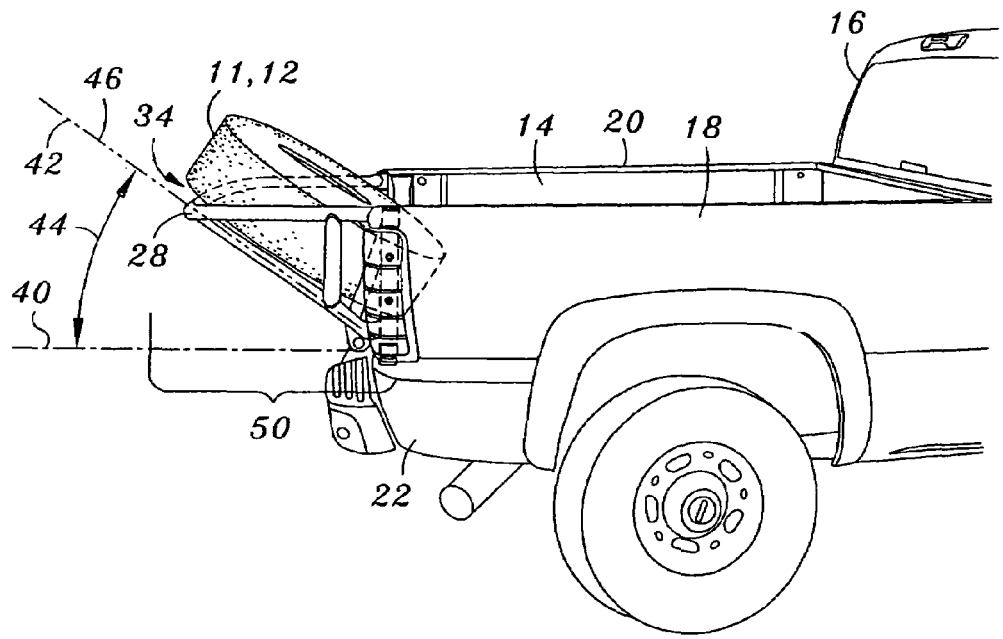
FIG. 2 is a perspective side view of the apparatus in an outboard position.

Referring now to FIGS. 1 and 2, the storage bed 14 of the vehicle 16 includes first and second side walls 18, 20 and a rear end 22. The apparatus 10 comprises a vertical post 24, a latch member 26, and a gate 28. The vertical post 24 may be connectable to the first side wall 18 adjacent the rear end 22. The latch member 26 may be connectable to the second side wall 20 adjacent the rear end 22. As will be understood by one of skill in the art, the placement of the vertical post 24 and the latch member 26 may easily be modified with the vertical post 24 being connectable to the second side wall 20 and the latch member 26 being connectable to the first wall 18. The gate 28 may define first and second ends 30, 32 and a receptacle 34 interposed therebetween. The first end 30 may be pivotally connectable to the vertical post 24, and the second end 32 being removably connectable to the latch member 26. The receptacle 34 may be sized and configured to accommodate the module 11 with the module 11 being mountable thereon.

Figure 5:
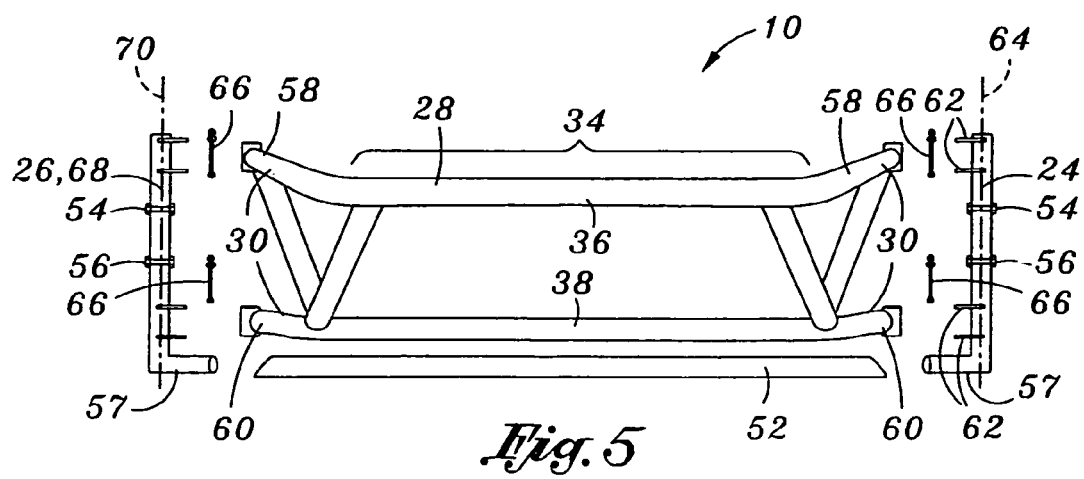
FIG. 5 is an exploded view of the apparatus illustrating exemplary elements thereof.

The receptacle 34 may be variously configured to accommodate the module 11 thereon. As shown in FIG. 5, it is contemplated that the receptacle 34 may be geometrically configured to include upper and lower portions 36, 38. The upper and lower portions 36, 38 may be of tubular construction, such as tubular bars. The upper portion 36 may be bowed with respect to the lower portion 38 thereby forming a support area whereon the module 11 may rest and whereto the module 11 may be mounted. Upon mounting the module 11, such as a tire 12, this configuration may allow the tire 12 to be securely fastened to the gate 28 in order to reduce or eliminate tire 12 vibration and movement, as well as the stresses and bending moments caused thereby. Indeed, this advantageous aspect of the invention may provide that modules 11 are also securely stored onto the apparatus 10. However, instead of the simple two member construction mentioned above, it is contemplated that the receptacle 34 may be formed utilizing a single member, which design is determined according to user requirements. Furthermore, other designs for the receptacle 34 may be developed by one skilled in the art that would provide various advantages such as stability, ease of manufacture, simplicity of construction, aesthetic qualities, and other characteristics in accordance with implementations of the present invention.

Referring again to FIG. 2, the storage bed 14 may define a horizontal plane 40 and the receptacle 34 may define a receptacle plane 42. The receptacle plane 42 may be oriented at an angle 44 with respect to the horizontal plane 40. Although the angle 44 may be any angle 44 from zero (0) to ninety (90) degrees, it is contemplated that a preferred embodiment includes orienting the receptacle plane 42 at approximately a thirty-five (35) degree angle 44 with respect to the horizontal plane 40.

The receptacle plane 42 may be variously defined. In one implementation of the present invention, the receptacle plane 42 may be defined as the plane formed by the upper and lower portions 36, 38 of the receptacle 34. For example, as shown in FIG. 1, the gate 28 may be of tubular construction, and the upper and lower portions 36, 38 thereof may define the receptacle plane 42 as shown. As discussed previously, the receptacle 34 may be variously configured to accommodate the module 11. Thus, various shapes and geometries may be utilized to form the receptacle 34, and it is contemplated that the receptacle 34 may not include easily distinguishable upper and lower portions 36, 38. Indeed, the receptacle 34 may be geometrically different depending on whether it is configured to store the tire 12, the tools, the gas can, the lift jack, the lights, or other modules 11, and whether such configuration provides for storage of multiple modules 11 or only for a single module 11 such as the tire 12, as shown in FIG. 1. In some cases, the receptacle plane 42 may be defined by the orientation of the tire 12 mounted on the receptacle 34. In other words, the receptacle plane 42 may be defined as a tire plane 46, the tire plane 46 being oriented perpendicular with respect to a rotating axis of the tire 12, when the tire 12 is mounted on the receptacle 34. For example, referring to FIGS. 2 and 4, the tire plane 46 is the same plane as that defined by the upper and lower portions 36, 38 of the receptacle 34. Thus, in cases where the upper and lower portions 36, 38 do not clearly form a plane therebetween, the tire plane 46 may be utilized to define the receptacle plane 42.

Figure 4:
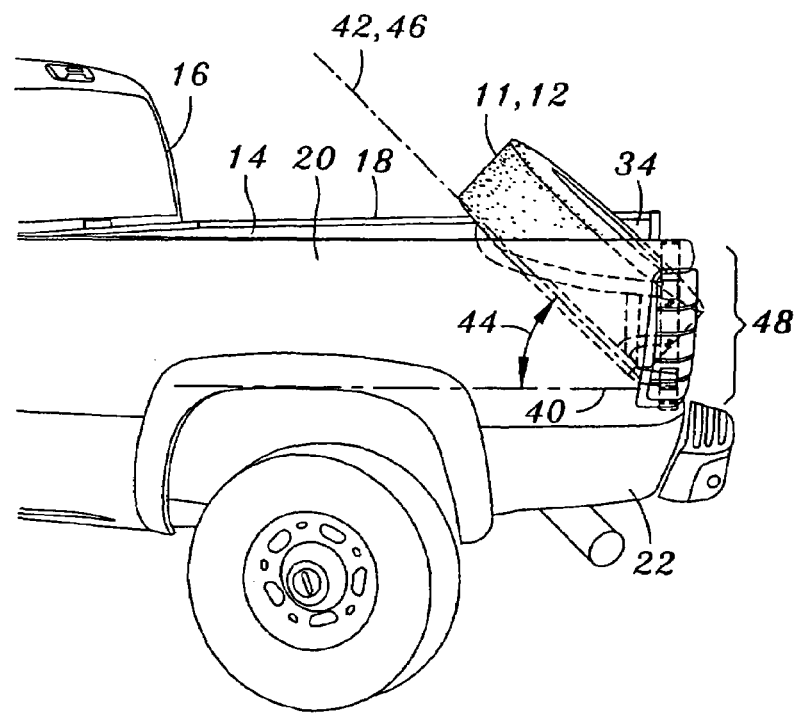
FIG. 4 is a perspective side view of the apparatus in an inboard position whereupon a module, illustrated as a tire, has been substantially horizontally mounted.
Figure 7:
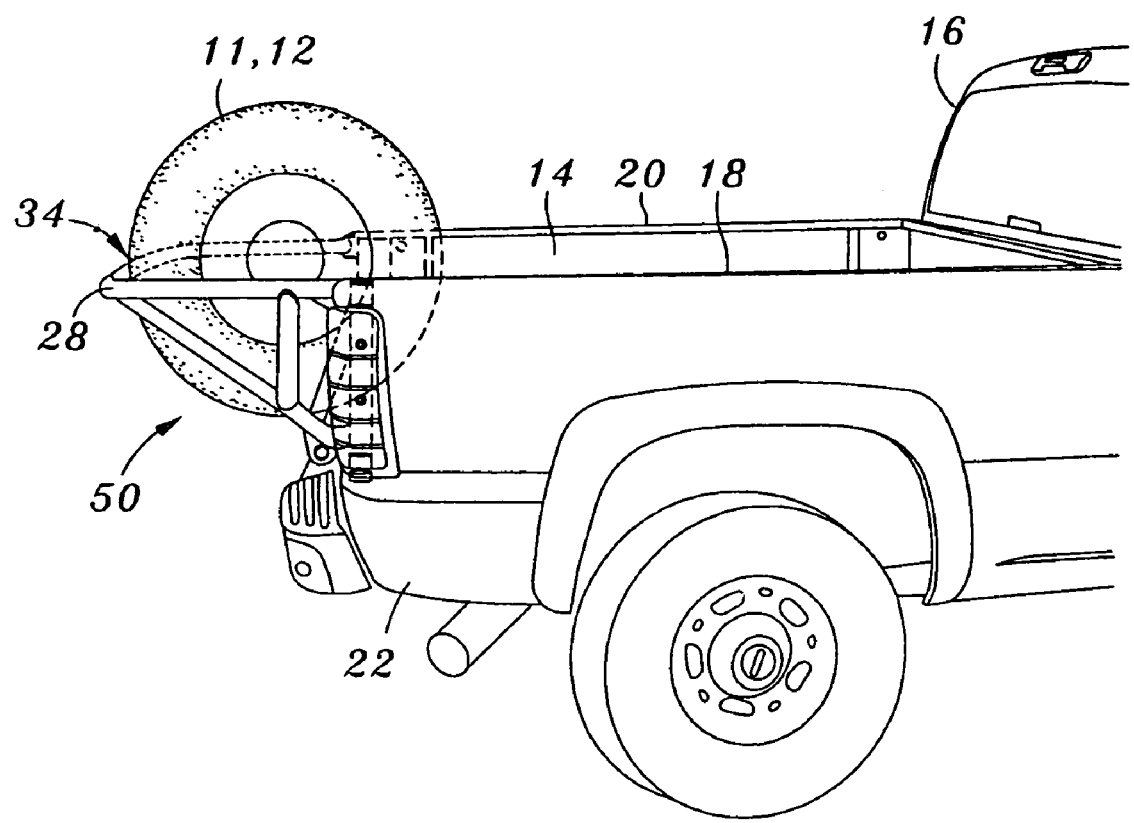
FIG. 7 is a perspective side view of the apparatus whereupon the tire has been vertically mounted.

The receptacle 34 may also be variously configured to mount the module 11, such as the tire 12, thereon. For example, the receptacle 34 may be sized and configured with the tire 12 being mountable thereon with the tire plane 46 being oriented substantially parallel with respect to the receptacle plane 42, as shown in FIGS. 2 and 4. Additionally, the receptacle 34 may be sized and configured with the tire 12 being mountable therein with the tire plane 46 being oriented substantially orthogonal with respect to the horizontal plane 40 of the bed 14, as shown in FIG. 7.

Figure 3:
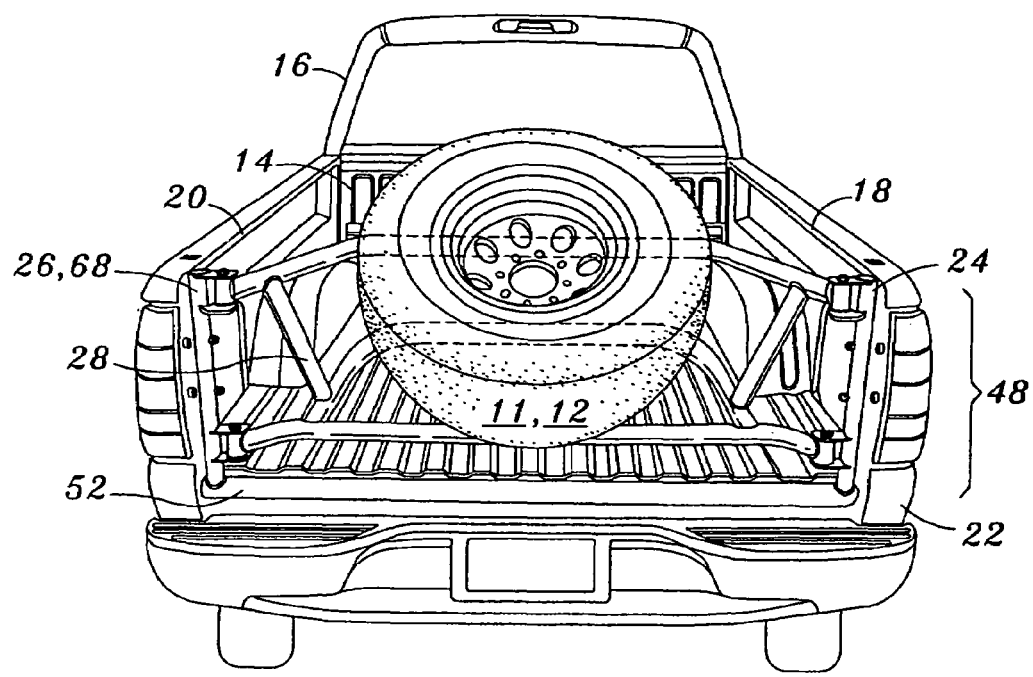
FIG. 3 is a perspective rear view of the apparatus in accordance with another aspect of the present invention.

As illustrated in FIGS. 3 and 4, the receptacle 34 may be substantially disposable within the bed 14 of the vehicle 16 in what may be termed an "inboard" position 48. The inboard position 48 may thus allow a user to eliminate any external protrusion from the rear end 22 of the vehicle 16. This may be a preferred mode of use for city driving. However, as illustrated in FIGS. 1 and 2, it is also contemplated that the receptacle 34 may be substantially disposable outside of the bed 14 of the vehicle 16 in what may be termed an "outboard" position 50. The outboard position 50 may allow the user to maximize storage space within the bed 14 of the vehicle 16. The user may also utilize the inboard or outboard position 48, 50 due to requirements of balance or weighting of the vehicle 16, thus allowing the user to shift the center of mass of the apparatus 10 to outside or inside of the storage bed 14, as required. In either the inboard or outboard positions 48, 50, the user may obtain full access to the bed 14 of the vehicle 16 utilizing the pivotal movement of the gate 28. It is also contemplated that the user may adjust the gate 28 from the inboard position 48 to the outboard position 50 by removing and replacing the gate 28 as desired.

In accordance with another aspect of the present invention, the apparatus 10 may further include a transverse torque arm 52. The transverse torque arm 52 may extend between the vertical post 24 and the latch member 26 and may be mechanically engageable to each of the vertical post 24 and the latch member 26. The transverse torque arm 52 may be configured to enhance the rigidity and other strength properties of the apparatus 10 during use. The transverse torque arm 52 thus may prevent bending and deformation of the apparatus 10 due to forces exerted on the apparatus 10. However, the transverse torque arm 52 is an optional feature of an embodiment of the invention.

As illustrated in FIGS. 1-5, it is contemplated that the vertical posts 24 may be tubular. Further, it is contemplated that the gate 28 may be of tubular construction. The apparatus 10, including the vertical posts 24 and the gate 28, may also be of solid construction, constructed from sheet metal, or various other processes known in the art. The apparatus 10 may also be manufactured from any material such as a polymer, metal, or composite. Thus, the material and construction of the apparatus 10 may be variously modified by one of skill in the art according to user requirements.

The vertical posts 24 may also be connectable to the respective side walls of the vehicle 16 utilizing a variety of mounting fixtures. In particular, it is contemplated that both vertical posts 16 may be configured to be interchangeable/reversible from the first side wall 18 to the second side wall 20, or vise versa. Thus, manufacture of the vertical posts 16 may be simplified by only requiring construction of a single configuration (i.e. structure) of the vertical post 16, which may be used for attachment to either the first or second side wall 18, 20. Indeed, the attachment mechanisms utilized by the vertical posts 16 to attach to the gate 28 and to the first and second side walls 18, 20, may be reversible in order to ensure that the vertical posts 16 may be interchangeable for either the first or second side wall 18, 20, and for use of the gate 28 in the inboard or outboard position 48, 50. This unique aspect of the invention also ensures that installation may be much less complicated and more foolproof.

As mentioned previously, according to a preferred embodiment of the present invention, the apparatus 10 may be configured to be a replacement to the standard tailgate, and thus utilize the standard tailgate mounting points without requiring any modifications to the storage bed 14. For example, as shown in FIG. 5, the vertical posts 24 may include a latching pin 54, a tether pin 56, and a tailgate pivot 57, which may be attachable at conventional positions found on most pickups. In this regard, the user may not be required to modify the existing side walls of the vehicle 16, but may use the positions defined by conventional tailgate latches, cables, and pivots. The latching pin 54, the tether pin 56, and the tailgate pivot 57 may be operative to secure the vertical posts 24 to the respective side wall. It is contemplated that the latching pin 54, the tether pin 56, and the tailgate pivot 57 may be variously configured and that one or both of them may be utilized in order to secure the vertical post 24 to the side wall. Further, it is contemplated that the latching pin 54, the tether pin 56, and the tailgate pivot 57 may be configured to provide other functionality to the apparatus 10, such as allowing the apparatus 10 to pivot vertically, for example, about the transverse torque arm 52 or a suitable horizontal axis such as by utilizing the tailgate pivot 57. In this regard, the apparatus 10 may thus be operative to pivot horizontally and vertically, as disclosed herein, to provide access to the bed 14 of the truck.

Figure 6:
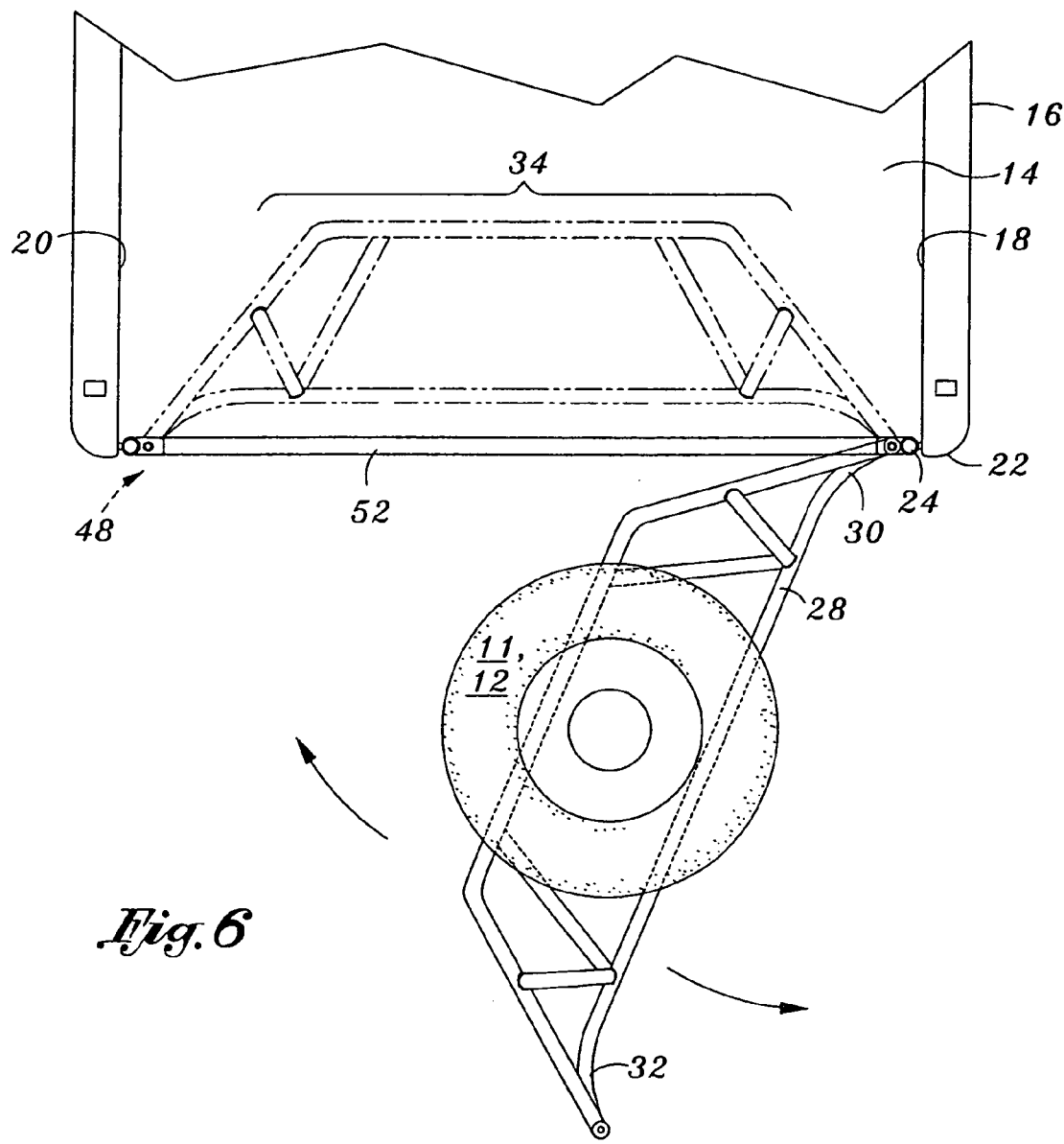
FIG. 6 is a top view of the apparatus illustrating pivotal movement thereof about a first vertical axis in accordance with another embodiment of the present invention.

Referring now to FIG. 5, the first end 30 of the gate 28 may include upper and lower mounts 58, 60 and the first vertical post 24 may include a pair of hinge elements 62 sized and configured to receive the respective ones of the upper and lower mounts 58, 60. However, it is contemplated that first end 30 of the gate 28 may include a single mount and that the first vertical post 24 may include a single hinge element 62 sized and configured to receive the mount of the first end 30 of the gate 28. Additionally, the first vertical post 24 may define a first vertical axis 64, and the apparatus 10 may further include pivot pin(s) 66. In this regard, the pivot pin(s) 66 may be selectively disposable through the hinge element(s) 62 and the respective ones of the single mount or the upper and lower mounts 58, 60 with the first end 30 being pivotal about the first vertical axis 64, as shown in FIG. 6. The pivot pins 66 may be bolts, latches, or other pin elements that may facilitate the use of the pivot pins 66, according to user requirements, such as to facilitate pivotal opening of the gate 38 or to replace the gate 28 from the inboard to the outboard position 48, 50, or vise versa.

The latch member 26 may also be a second vertical post 68. As shown in FIG. 5, the second end 32 of the gate 28 may include upper and lower mounts 58, 60, and the second vertical post 68 may include a pair of hinge elements 62 sized and configured to receive the respective ones of the upper and lower mounts 58, 60. However, it is contemplated that second end 32 of the gate 28 may include a single mount and that the second vertical post 68 may include a single hinge element 62 sized and configured to receive the mount of the second end 32 of the gate 28. The apparatus 10 may further include pivot pin(s) being selectively disposable through the hinge element(s) 62 and the respective ones of the single mount or the upper and lower mounts 58, 60. The pivot pin(s) may be operative to impede the horizontal pivoting of the gate 28 about the first vertical axis 64. As mentioned above, the pivot pins 66 may be variously configured according to user requirements. Furthermore, it is contemplated that the pivot pins 66 may be integrated into either the vertical posts 24, 68 or the gate 28. Such a configuration may thus eliminate the need for manual removal and insertion of the pivot pins 66 each time that the gate 28 is changed from inboard to outboard positions 48, 50, or when the gate is simply unlatched for vertical or horizontal pivoting to provide access to the bed 14. Thus, it is contemplated that the pivot pins 66 may be configured to facilitate closure of the gate 28, such as by latching in place upon closing the gate 28. Other modifications may be implemented by one of skill in the art, such as spring-mechanisms may be utilized to induce automatic closing of the gate 28, and the like.

In accordance with another embodiment of the present invention, a tire carrier apparatus 10 is provided for mounting a tire 12 upon a storage bed 14 of a vehicle 16. The storage bed 14 may include first and second side walls 18, 20 and a rear end 22. The apparatus 10 may comprise first and second vertical posts 24, 68 and a gate 28. The first and second vertical posts 24, 68 may each be connectable to the respective ones of the first and second side walls 18, 20 adjacent the rear end 22. The first and second vertical posts 24, 68 may also each define respective first and second vertical axes 64, 70. The gate 28 may define first and second ends 30, 32 and a receptacle 34 interposed therebetween. The first and second ends 30, 32 may be pivotally connectable to the respective ones of the first and second vertical posts 24, 68. In this regard, the first end 30 may be pivotable about the first vertical axis 64 upon the second end 32 being unconnected from the second vertical post 68. Additionally, the second end 32 may be pivotable about the second vertical axis 70 upon the first end 30 being unconnected from the first vertical post 24. Further, the receptacle 34 may be sized and configured to accommodate the tire 12 with the tire 12 being mountable thereon.

The apparatus 10 may further include pivot pin(s) 66 which may be utilized to pivotally connect at least one of the first or second ends 30, 32 to one of the first or second vertical posts 24, 68.

According to an aspect of the present invention, as shown in FIGS. 2 and 4, the storage bed 14 may define a horizontal plane 40 and the receptacle 34 may define a receptacle plane 42. In this regard, the receptacle plane 42 may be oriented at an angle 44 with respect to the horizontal plane 40. Although the angle 44 may be any angle 44 from zero to ninety degrees, it is contemplated that a preferred embodiment includes orienting the receptacle plane 42 at a 35 degree angle 44 with respect to the horizontal plane 40.

The receptacle 34 may be substantially disposable within the bed 14 of the vehicle 16 in what may be termed an inboard position 48. Additionally, the receptacle 34 may be substantially disposable outside of the bed 14 of the vehicle 16 in what may be termed an outboard position 50.

As discussed above, the receptacle 34 may be variously configured to mount the tire 12 thereon. For example, the receptacle 34 may be sized and configured with the tire 12 being mountable thereon with the tire plane 46 being oriented substantially parallel with respect to the receptacle plane 42, as shown in FIGS. 2 and 4. Additionally, the receptacle 34 may be sized and configured with the tire 12 being mountable therein with the tire plane 46 being oriented substantially orthogonal with respect to the horizontal plane 40 of the bed 14, as shown in FIG. 7.

As discussed above, the apparatus 10 may further include a transverse torque arm 52. The transverse torque arm 52 may extend between the vertical post 24 and the latch member 26 and may be mechanically engageable to each of the vertical post 24 and the latch member 26. As also discussed above, although optional, the transverse torque arm 52 may mitigate against forces acting upon the apparatus that may otherwise cause deformation of the apparatus 10.

As illustrated in FIGS. 1-5, it is contemplated that the vertical posts 24 may be tubular. Further, it is contemplated that the gate 28 may be of tubular construction. As mentioned above, the material and construction of the apparatus 10 may be variously modified by one of skill in the art according to user requirements.

As discussed previously, the vertical posts 24 may also be connectable to the respective side walls of the vehicle 16 utilizing a variety of mounting fixtures, such as a latching pin 54, a tether pin 56, and a tailgate pivot 57, which may be attachable at conventional positions on most pickups, as described above. The latching pin 54, the tether pin 56, and the tailgate pivot 57 may be operative to secure the vertical posts 24 to the respective side wall and may provide horizontal and vertical pivoting of the apparatus 10, as disclosed herein, to provide access to the bed 14 of the truck.

In accordance with yet another embodiment of the present invention, a tire carrier apparatus 10 is provided for mounting a tire 12 upon a storage bed 14 of a vehicle 16. The storage bed 14 may include first and second side walls 18, 20 and a rear end 22 and defining a horizontal plane 40. The apparatus 10 may comprise first and second tubular vertical posts 24, 68, a gate 28, and a transverse torque arm 52. The first and second tubular vertical posts 24, 68 may each be connectable to the respective ones of the first and second side walls 18, 20 adjacent the rear end 22. The first vertical post 24 may define a first vertical axis 64. The gate 28 may define first and second ends 32 and a receptacle 34 interposed therebetween. The gate 28 may be of tubular construction. The first end 30 may be pivotally connectable to the first vertical post 24 and pivotal about the first vertical axis 64. The second end 32 may be removably connectable to the second vertical post 68. The receptacle 34 may define a receptacle plane 42 being oriented at an angle 44 with respect to the horizontal plane 40. The receptacle 34 may also be sized and configured to accommodate the tire 12 with the tire 12 being mountable thereon. The transverse torque arm 52 may extend between the vertical posts 24 and may be mechanically engageable thereto.

The receptacle 34 may be substantially disposable within the bed 14 of the vehicle 16 in what may be termed an inboard position 48. Additionally, the receptacle 34 may be substantially disposable outside of the bed 14 of the vehicle 16 in what may be termed an outboard position 50.

The above description is given by way of example, and not limitation. Given the above disclosure, one skilled in the art could devise variations that are within the scope of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A utility carrier apparatus for mounting a module upon a truck bed of a truck, the truck bed including first and second standard tether pin receptacles, first and second standard latching pin receptacles and first and second standard tailgate pivot receptacles, the apparatus comprising:
    a. a vertical post being connectable to the first standard tether pin receptacle, the first standard latching pin receptacle, and the first standard tailgate pivot receptacle of the truck bed;
    b. a latching member being connectable to the second standard tether pin receptacle, the second standard latching pin receptacle, and the second standard tailgate pivot receptacle of the truck bed; and
    c. a gate defining first and second end portions and an angled module receptacle interposed therebetween, the first end portion being pivotally connectable to the vertical post, the second end portion being removably connectable to the latch member.

2. The apparatus of claim 1 wherein the receptacle further comprises an upper portion bowed with respect to a lower portion of the receptacle thereby forming a module supporting and mounting area.

3. The apparatus of claim 1 wherein the gate is openable laterally from the second end portion when a latch pin connecting the latch member and the second end portion is removed therefrom or openable vertically about a tailgate pivot defined by the first and second standard tailgate pivot receptacles.

4. The apparatus of claim 1 wherein the first end portion of the gate includes upper and lower mounts and the vertical post includes a pair of hinge elements sized and configured to receive the respective ones of the upper and lower mounts, the vertical post defining a first vertical axis, the gate being pivotal about the first vertical axis.

5. The apparatus of claim 1 wherein the angled module receptacle defines a receptacle plane and the truck bed defines a horizontal plane, the receptacle plane being oriented at an angle between 0 degree and 90 degrees with respect to the horizontal plane.

6. The apparatus of claim 5 wherein the receptacle plane is oriented at a 35 degree angle.

7. The apparatus of claim 1 wherein the vertical post, latching member, and gate have a tubular construction.

8. A utility carrier apparatus for mounting a module upon a storage bed of a vehicle, the bed including first and second side walls, the apparatus comprising:
    a. a vertical post being connectable to the first side wall;
    b. a latch member being connectable to the second side wall;
    c. a gate defining the first and second end portions and an angled module receptacle interposed therebetween, the first end portion of the gate being connectable to either the vertical post or latch member, the gate second end portion being connectable to either the vertical post or the latch member;

d. wherein the gate first end portion may initially be connected to the vertical post and the gate second end portion may initially be connected to the latch member such that the angled module receptacle is in an inward position, and the gate first and second end portions may subsequently be removed from the vertical post and the latch member, respectively and reattached to the latch member and vertical post respectively so as to reverse the receptacle from the inward position to an outward position.

9. The apparatus of claim 8 wherein the receptacle further comprises an upper portion bowed with respect to a lower portion of the receptacle thereby forming a module supporting and mounting area.

10. The apparatus of claim 8 wherein the gate is openable laterally from the second end portion when a latch pin is removed from the latch member or openable vertically about a tailgate pivot.

11. The apparatus of claim 8 wherein the storage bed defines a horizontal plane and the angled module receptacle defines a receptacle plane, the receptacle plane being oriented at an angle between zero degrees and ninety degrees with respect to the horizontal plane.

12. The apparatus of claim 11 wherein the receptacle plane is oriented at a 35 degree angle.

13. The apparatus of claim 8 wherein the vertical post, latch member and gate have a tubular construction.

* * * * *